United States Patent Office
3,660,304
Patented May 2, 1972

3,660,304
METHOD OF PRODUCING OILY LIQUID-CONTAINING MICROCAPSULES
Hiroharu Matsukawa, Fujimiya-shi, Japan, assignor to Fuji Photo Film Co., Ltd., Kanagawa, Japan
No Drawing. Filed June 4, 1969, Ser. No. 830,539
Claims priority, application Japan, June 4, 1968, 43/38,087
Int. Cl. B01j 13/02; B44d 1/02
U.S. Cl. 252—316
21 Claims

ABSTRACT OF THE DISCLOSURE

A method for producing microcapsules including dissolving a hydrophobic, shell forming polymer in a low boiling point solvent, mixing the resulting solution in a water-insoluble high boiling point solvent which is a poor solvent for the polymer, emulsifying the mixture in an aqueous medium at a temperature below the boiling point of the low boiling solvent, and heating the emulsion to above the boiling point of the low boiling solvent, but below the boiling point of the high boiling solvent.

BACKGROUND OF THE INVENTION

(1) Field of the invention

This invention relates to a method of producing oily liquid-containing microcapsules, and more particularly, to a method of producing microcapsules of a particle size of from a few microns to several hundred microns which consist of an oily liquid containing a water-insoluble solvent or water-insoluble solid dissolved or dispersed therein, and a shell of a hydrophobic polymer.

(2) Description of the prior art

Although various methods for the preparation of microcapsules are known, for example, phase separation processes using aqueous solutions disclosed in U.S. Pats. 2,800,457 and 2,800,458; phase separation processes using organic solvent solutions as disclosed in U.S. Pat. 3,155,590; intersurfacial polymerization processes in vapors, or aqueous or organic liquid phases as disclosed in Japanese patent publication No. 4,323/66; British Pat. Nos. 950,443, 989,264, and 1,046,409; and U.S. Pat. No. 3,121,698; polycondensation processes using an initial condensate as disclosed in Japanese patent publication No. 19,574/63; melt dispersion processes as disclosed in Japanese patent publication No. 528/67 and U.S. Pat. No. 3,167,602, and content exchange processes as disclosed in Japanese patent publication No. 8,805/64. Also chemical processes, e.g. spray dry processes, perforation centrifugal processes, gaseous dispersion coating processes and mechanical processes, electrostatic capsulating processes, and like electrical processes are known. However, all of the prior methods are too complicated and require large scale apparatus.

SUMMARY OF THE INVENTION

The object of the present invention is to provide a method of efficiently producing single microcapsules having a seamless shell of a water-insoluble polymer. Another object of the present invention is to provide a novel process for the production of microcapsules. The objects of the present invention are attained by making a shell-forming polymer and an oily liquid, which are inherently immiscible, miscible with each other by the aid of a low boiling point solvent, and a high boiling point solvent. The polymer is soluble in the low boiling point solvent, and the differences in the solubility of the polymer in the low boiling point solvent and the high boiling point solvent, as well as the difference in boiling point between said two solvents is used. Namely, a polymer, as the shell-forming material, is dissolved in a low boiling point solvent (primary solution), and the resulting solution is mixed with a high boiling point solvent, as core material, to obtain a secondary solution. The secondary solution is emulsified in water at a temperature below the boiling point of the low boiling point solvent to form an oil-in-water emulsion. After dilution with water, the temperature of the system was gradually raised to a temperature above the boiling point of the low boiling point solvent or, alternately, the emulsion is poured directly into water maintained at a temperature above the boiling point of the low boiling point solvent. Thus, the primary solvent is the only component that separates into the aqueous phase, and the microcapsules are formed thereby. Each capsule consists of a drop of oily liquid (namely, high boiling point solvent) and a shell of the hydrophobic polymer formed in the interface of the oily liquid and aqueous phase.

Although any water-insoluble, organic solvent-soluble polymer may be used as the shell-forming material in the practice of the present invention, those which are quite insoluble or slightly soluble in the high boiling point solvent are preferred. However, more soluble polymers may be used if a non-solvent for the polymer, which has a higher boiling point than the low boiling point solvent and is miscible with the high boiling point solvent, is added in order to lower the solubility of the polymer in the organic liquid medium. In this case, the solvent is added for the purpose of lowering the solubility of the polymer and also forms the core material.

Since in the method of the present invention, the shell is subjected to an elevated temperature during its formation, it is preferred that a thermosetting resin be used to enhance the thermal resistance of the shell.

The polymer, suitably used in the practice of the present invention, is exemplified by: phenolic resins, urea resins, melamine resins, furan resins, xylene resins, petroleum resins, unsaturated polyester resins, epoxy resins, polyurethane resins, alkyd resins, silicone resins, acrylic resins, polysulfide resins, aniline resins, diaryl phthalate resins, polyimide resins, polyvinyl chlorides, polyvinylidene chlorides, polyvinyl acetates, polyvinyl alcohols, polystyrenes, polyamides, polyolefins, polycarbonates, polyethers, cellulose plastics, and mixtures thereof. The polymers have polymerization degrees of $10^4$ to $10^6$.

The oily liquid, as core material, includes natural and synthetic oils which are substantially insoluble in water and have a boiling point of at least 150° C., such as paraffin oil, kerosene; cotton seed oil, soy bean oil, corn oil, olive oil, castor oil; lemon oil, and like citrus oils; fish oil, fat and like animal oils; abietic acid derivatives, adipic acid derivatives, amylphenol derivatives, biphenyl derivatives, hydrocarbons, naphthalene derivatives, phosphoric acid derivatives, phthalic acid derivatives, ricinoleic acid derivatives and the like.

The solvent used for lowering the solubility of the polymer in the core material may be exemplified by mineral spirits, kerosene, terpenes, petroleum naphtha #3, heavy solvent naphtha and like petroleum solvents.

The preferred low boiling point solvents are those having boiling points lower than that of water under normal pressure. They are required to be good solvents for the polymer and compatible with the high boiling point solvent. Examples are methylene chloride (B.P. 40.2° C.), carbon disulfide (46.3° C.), acetone (56.24° C.), methyl acetate (56.0° C.), chloroform (61.1° C.), tetrahydrofuran (66.0° C.), carbon tetrachloride (76.7° C.), ethyl acetate (77.1° C.), methyl ethyl ketone (79.5° C.), benzene (80° C.), allyl chloride (45.1° C.), ethyl ether (34.5° C.), petroleum ether (50–80° C.), n-pentane (36.7° C.), cyclopentane (49.3° C.), n-hexane (68.7° C.), cyclohexane (80.7° C.), and mixtures thereof.

The more hydrophilic the low boiling point solvent is the more uniform the particle size of the resulting microcapsules.

A water-soluble protective colloid and/or a surface active agent may be used for emulsifying the oily liquid as core material in water.

Suitable protective colloids include natural or synthetic hydrophilic high molecular compounds such as gelatin, gum arabic, casein, hydroxyethyl cellulose, carboxymethyl cellulose, starch, polyvinylpyrrolidone and sodium polyacrylate. The surface active agents include anionic compounds, such as fatty acid salts, salts of higher alcohol sulfates, alkylbenzene sulfonates, alkylnaphthalene sulfonates, or salts of poly(oxyethylene)sulfates; nonionic compounds, such as poly(oxyethylene)alkyl ethers, poly(oxyethylene) alkylphenol ethers, sorbitol fatty acid esters, poly(oxyethylene)sorbitol fatty acid esters, poly(oxyethylene) alkyl esters or fatty acid monoglycerides; and cationic compounds, such as, quaternary ammonium salts with long chain alkyl group(s) or pyridinium salts.

The desired amount of the polymer shell-forming material is determined by the amount of core material, and the desired thickness of the shell wall. In general, the polymer preferably is used in an amount of from 1/20 to 1/5 by weight of the core material, and more than 1/10 by weight of the low boiling point solvent. The low boiling point solvent preferably is used in an amount insufficient to cause precipitation of the polymer in the core material.

In order to strengthen the shell of the capsules in the method of the present invention, a polyisocyanate compound, polyester acrylate, cyanoacrylate or like compound which is soluble in the low boiling point solvent is added in an amount of at least 1/5 by weight of the shell-forming material. The preferred polyisocyanates include triphenylmethane triisocyanates, methylene-bis(p-phenylene isocyanate), hexamethylene diisocyanate-hexanetriol adduct, 1,6-hexamethylene diisocyanate, tolylene diisocyanates, 1-chlorophenyl-2,4-diisocyanate, 1,5-naphthalene diisocyanate, thiodipropyl diisocyanate, ethylbenzene-$\alpha$,2-diisocyanate, 2,4-tolylene diisocyanate dimer, adducts of hexanetriol and tolylene diisocyanates, adducts of trimethylolpropane and tolylene diisocynates, and the like.

According to the method of the present invention, the capsule shells are efficiently formed of the polymer, the thickness and permeability of the shell is easily controlled by the kind and amount of the polymer used, and the capsulization is attained without any difficulty.

In the method of the present invention, no cohesion of the resulting micro-capsules occurs, and the micro-capsules are obtained as loose particles since the formation of the shell wall is initiated, not by accumulation of the hydrophilic colloid contained in the continuous aqueous phase, but by accumulation from individual oil drops in the discontinuous dispersion phase. Accordingly, the concentration, agitating speed and other factors have a relatively large influence, especially when the present process is compared with prior methods such as phase separation. The microcapsules obtained have high uniformity, which differs from encapsulation by coacervation.

The present invention will now be illustrated in more detail by the following examples in which all parts are by weight.

EXAMPLE I

A core material was prepared by dissolving Crystal Violet lactone in a solvent mixture of 3 parts of trichlorodiphenyl and 1 part of kerosene, the kerosene being a poor solvent for the polymeric material forming the shell wall and constituting the core material together with trichlorodiphenyl upon completion of capsulation.

1.5 g. of polymethylmethacrylate was dissolved in 15 g. of methylene chloride (primary solution) and the resulting solution was mixed with 30 g. of the above core material (secondary solution). 30 g. of the secondary solution was gradually added to a solution of 5 g. of gum arabic in 20 g. of water at 30° C. and emulsified by means of an ultrasonic emulsifier to form an oil-in-water emulsion. The particle size in the emulsion was 10 microns and the vessel was externally cooled to prevent the temperature of the system from exceeding 30° C. At this stage, if the temperature of the system exceeds 40° C., encapsulization is initiated and non-uniform capsules are formed. After completion of the emulsification, 150 g. of water at a temperature of 35° C. was added to the system while stirring, and the temperature of the system was gradually raised to 70° C. over 30 minutes. The stirring was then continued at 70° C. for 20 minutes to complete the encapsulation. A coating of the liquid was formed on a sheet of paper, and the coated paper was kept in a hot air drying box at 75° C. for 1 hour for a thermal resistance test. When the coated paper was superposed on a clayed paper and stamped, a distinct colored mark was obtained. The capsules may be recovered in dry powdery form by spray drying.

EXAMPLE II

The procedure of Example I was followed, except that 1.0 g. of a vinyl acetate-vinyl chloride copolymer was used in place of poly(methyl methacrylate), and 10 g. of acetone was used in place of methylene chloride. The resulting primary solution was added to 25 g. of the core material of Example I to form a secondary solution. 3 g. of gum arabic was dissolved in 25 g. of water at 30° C., and then 0.1 g. of Turkey red oil was added thereto. 35 g. of the secondary solution was added to the resulting solution with stirring by means of a propeller stirrer. The stirring was continued until the particle size of oil drops was reduced to 5 microns while maintaining the temperature of the system at 29–31° C. The emulsion, thus obtained, was added to 150 g. of water at 35° C. The temperature of the system was raised to 75° C. over about 1 hour and the system was maintained at this temperature for 30 minutes while continuing stirring. The system was then cooled to room temperature to complete microcapsulation. The microcapsules thus obtained formed a satisfactory colored mark after a thermal resistance test at 75° C. for 1 hour.

EXAMPLE III 1.2 g. of polystyrene was dissolved in 1.5 g. of acetone, and, after addition of Crystal Violet lactone to form a 0.5% solution, 30 g. of diisooctyl phthalate was mixed therewith to form a secondary solution.

6 g. of gum arabic was dissolved in 75 g. of water at 30° C., then the secondary solution was emulsified therein by means of an ultrasonic emulsifier. When the particle size became, at most, 15 microns, 75 g. of warm water at 70° C. was added to the emulsion. While stirring by means of a propeller stirrer, the temperature of the system was raised to 80° C. and after 30 minutes, cooled to 30° C. Thus, microcapsules containing dioctyl phthalate were obtained. The coated paper gave a distinctive color after a thermal resistance test at 60° C. for 1 hour.

EXAMPLE IV 4 g. of a concentrated amino resin (Uban 10 HV, a butylated amino resin, produced by Toyo Koatsu Industries, Inc.) was diluted by 16 g. of tetrahydrofuran to form a primary solution having an amino resin content of 16%. The solution was mixed with 20 g. of di-n-octylphthalate, and then with 10 g. of #3 petroleum naphtha. This secondary solution contained, dissolved therein 1.0% of Crystal Violet lactone.

4 g. of gelatin was dissolved in 30 g. of warm water at 30° C. Then 0.2 g. of an alkylbenzenesulfonate (Neogren, produced by Dai-ichi Kogyo Seiyaku Co. Ltd.) as emulsifier, was added, and the above secondary solution was emulsified in the resulting aqueous gelatin solution. When the particle size of oil particles was reduced to, at most, 15 microns, 140 g. of warm water at 40° C. was added to the emulsion. The temperature was gradually raised to 80° C. and stirring was continued at this temperature for 20 minutes. 3 cc. of a 37% Formalin was added to the emulsion and the pH of the emulsion was adjusted thereby to 10 in order to improve the thermal resistance of the resulting capsules. The capsule-coated paper formed a satisfactorily distinct colored mark after a thermal resistance test at 75° C. for 1 hour.

EXAMPLE V 4 g. of a concentrated amino resin (Uban 20 HV, an n-butylated melamine resin, produced by Toyo Koatsu Industries, Inc.) was dissolved in 15 g. of acetone to form a primary solution. A core material consisting of a mixture of 20 g. of trichloro diphenyl and 10 g. of kerosene containing, dissolved therein, 1.5% of Crystal Violet lactone was mixed with the above primary solution.

The secondary solution, thus formed, was capsulated in the same manner as in Example IV. The resulting capsule-coated paper well withstood a thermal resistance test at 50° C. for 1 hour.

EXAMPLE VI

The procedure as in Example V was repeated except that 4 g. of a butylated urea-melamine resin (Uban 33, produced by Toyo Koatsu Industries, Inc.) was used in the preparation of a secondary solution.

EXAMPLE VII 2.5 g. of triacetylcellulose and 0.5 g. of a masked polyisocyanate (Coronate AP Stable, produced by Nippon Polyurethane Co., Ltd.) were dissolved in 15 g. of methylene chloride to form a primary solution. The solution was mixed with a core material consisting of 20 g. of trichlorodiphenyl and 5 g. of kerosene (containing 2.0% Crystal Violet lactone) to form a secondary solution. 5 g. of gum arabic was dissolved in 25 g. of water at 30° C., and 0.2 g. of a polyethyleneglycol nonylphenyl ether (Neugen EA/30T, by Dai-ichi Kogyo Seiyaku Co., Ltd., was added thereto as an emulsifier. The above secondary solution was added to the solution thus formed and the mixture was emulsified by means of an ultrasonic emulsifier to a dispersoid particle size of 5 microns. The resulting emulsion was added to 150 g. of warm water at 50° C. While stirring, the temperature of the system was raised to 80° C. and the temperature maintained there for 30 minutes to complete encapsulation.

The resulting capsules formed a satisfactory colored mark after a thermal resistance test at 125° C. for 1 hour.

EXAMPLE VIII 2 g. of an epoxy resin (Epikote 100, by Shell Petroleum Co.) and 0.5 g. of a urea resin (Uban 10 S, by Toyo Koatsu Industries, Inc.) were dissolved in 20 g. of acetone. Then a core material consisting of 20 g. of trichlorodiphenyl and 5 g. of kerosene (containing 2.0% of Crystal Violet lactone) was mixed therewith. Emulsification and encapsulization were preformed in the same manner as in Example VII. The resulting capsules formed a distinct colored mark after a thermal resistance test at 100° C. for 1 hour.

EXAMPLE IX 2 g. of an acrylic resin (Acrylloid C-10LV. by Rohm & Haas Co.) and 0.5 g. of an adduct of hexanetriol and tolylene diisocyanate (Desmodur TH, Bayer Co.) were dissolved in 15 g. of tetrahydrofuran. Then a core material of dioctyl phthalate containing 1.0% of Crystal Violet lactone was added thereto to form a secondary solution. Emulsification and capsulization were performed in the same manner as in Example VII.

The resulting capsules formed a distinct colored mark after a thermal resistance test at 100° C. for 1 hour.

EXAMPLE X

The procedure as in Example IX was repeated except that the primary solution was prepared by dissolving 2 g. of a thermosetting acrylamide copolymerizate (Dacron 500, by Pittsburgh Plate Glass Co.) and 0.5 g. of 4,4′,4″-triphenylmethane triisocyanate.

The resulting capsules formed a distinct colored mark after a thermal resistance test at 125° C. for 1 hour.

EXAMPLE XI 2.5 g. of a polyurethane resin (Paraprene Finish, by Hodogaya Chemical Co., Ltd.) was dissolved in 15 g. of methyl ethyl ketone. A mixture of 20 g. of trichlorodiphenyl and 5 g. of kerosene containing 1.0% of Crystal Violet lactone was added to the solution. Emulsification and capsulization were performed in a manner similar to that of Example VII. The thermal resistance of the resulting micro-capsules was enhanced by addition of 2–3% of a 37% Formalin to adjust the pH to 9 to 10.

EXAMPLE XII

The procedure as in Example IX was repeated except that 0.5 g. of a cyanoacrylate-based adhesive (Cyanobond, by Sumitomo Chemical Co., Ltd.) was used in place of the polyisocyanate.

The resulting capsules formed a distinct colored mark after a thermal resistance test at 80° C. for 1 hour.

What is claimed is:

1. A method for producing microcapsules containing an oily liquid which comprises:
   (a) dissolving a hydrophobic polymer for forming a shell of said microcapsules in a low boiling point solvent having a boiling point below that of water, which is a good solvent for said polymer,
   (b) mixing the resulting solution with a water-insoluble high boiling point solvent which is compatible with said low boiling point solvent, and is a poor solvent for said polymer,
   (c) emulsifying the resulting mixture in an aqueous medium at a temperature below the boiling point of said low boiling point solvent, and
   (d) heating said emulsion to a temperature not lower than the boiling point of said low boiling point solvent and not higher than the boiling point of said low boiling point solvent.

2. The method as claimed in claim 1, wherein said polymer is a member selected from the group consisting of phenolic resins, urea resins, melamine resins, furan resins, xylene resins, petroleum resins, unsaturated polyester resins, epoxy resins, polyurethane resins, alkyd resins, silicon resins, acrylic resins, polysulfide resins, aniline resins, diaryl phthalate resins, polyimide resins, polyvinyl chloride, polyvinylidene chloride, polyvinyl acetate, polyvinyl alcohol, polystyrene, polyamide, polyolefins, polycarbonates, polyethers, cellulose plastics, and mixtures thereof.

3. The method as claimed in claim 1, wherein said high boiling point solvent is a member selected from the group consisting of synthetic oils and natural oils, said oil having a boiling point higher than 150° C.

4. The method as claimed in claim 3, wherein said oil is a natural oil and is a member selected from the group consisting of citrus oil and animal oil.

5. The method as claimed in claim 3, wherein said oil is a synthetic oil and is a member selected from the group consisting of abietic acid derivatives, adipic acid derivatives, amylphenol derivatives, biphenyl derivatives, hydrocarbons, naphthalene derivatives, phosphoric acid derivatives, phthalic acid derivatives, and ricinoleic acid derivatives.

6. The method as claimed in claim 1, wherein the low boiling point solvent is a member selected from the group consisting of methylene chloride, carbon disulfide, acetone, ethyl acetate, methyl acetate, chloroform, tetrahydrofuran, carbon tetrachloride, methyl ethyl ketone, benzene, allyl chloride, ethyl ether, petroleum ether, n-pentane, cyclopentane, n-hexane and cyclohexane.

7. The method as claimed in claim 1, wherein the amount of said polymer is in the range of from $\frac{1}{20}$ to $\frac{1}{5}$ by weight based on the high boiling point solvent.

8. The method as claimed in claim 1, wherein the amount of said polymer is more than $\frac{1}{10}$ by weight based on the high boiling point solvent.

9. The method as claimed in claim 1, further comprising the addition of a water-soluble protective colloid selected from the group consisting of gelatin, gum arabic, casein, hydroxyethyl cellulose, carboxymethyl cellulose, starch, polyvinylpyrrolidone and sodium polyacrylate.

10. The method as claimed in claim 1, further comprising the addition of a member selected from the group consisting of an anionic surfactant, a nonionic surfactant, and a cationic surfactant.

11. A method for producing microcapsules containing an oily liquid which comprises:
(a) dissolving a hydrophobic polymer for forming a shell of said microcapsules and a compound for strengthening the shell of said microcapsules in a low boiling point solvent having a boiling point below that of water, which is a good solvent for said polymer and said compound, said compound for strengthening the shell being a member selected from the group consisting of polyisocyanates, polyester acrylates and cyanoacrylates,
(b) mixing the resulting solution with a water-insoluble high boiling point solvent which is compatible with said low boiling point solvent and a poor solvent for said polymer and said compound,
(c) emulsifying the resulting mixture in an aqueous medium at a temperature below the boiling point of said low boiling point solvent, and
(d) heating said emulsion to a temperature not lower than the boiling point of said low boiling point solvent and not higher than the boiling point of said low boiling point solvent.

12. The method as claim in claim 11, wherein said compound is more than $\frac{1}{5}$ by weight based on the polymer.

13. The method as claimed in claim 11, wherein said compound is a polyisocyanate and is a member selected from the group consisting of triphenylmethane triisocyanates, methylene-bis (p-phenylene isocyanate), hexamethylene diisocyanate-hexanetriol adducts, 1,6-hexamethylene diisocyanate, tolyene diisocyanate, thiodipropyl diisocyanate, ethylbenzene-α,2-diisocyanate, 2,4-tolylene diisocyanate dimer, adducts of hexanetriol and tolylene diisocyanates, and adducts of trimethylolpropane and tolylene diisocyanates.

14. The method as claimed in claimed in claim 11, wherein said high boiling point solvent is a member selected from the group consisting of synthetic oils and natural oils, said oil having a boiling point greater than 150° C.

15. The method as claimed in claim 14, wherein said oil is a synthetic oil and is a member selected from the group consisting of abietic acid derivatives, adipic acid derivatives, amylphenol derivatives, biphenyl derivatives, hydrocarbons, naphthalene derivatives, phosphoric acid derivatives, phthalic acid derivatives, and ricinoleic acid derivatives.

16. The method as claimed in claim 11, wherein said polymer is a member selected from the group consisting of phenolic resins, urea resins, melamine resins, furan resins, xylene resins, petroleum resins, unsaturated polyester resins, epoxy resins, polyurethane resins, alkyd resins, silicone resins, acrylic resins, polysulfide resins, aniline resins, diaryl phthalate resins, polyimide resins, polyvinyl chloride, polyvinylidene chloride, polyvinyl acetate, polyvinyl alcohol, polystyrene, polyamide, polyolefins, polycarbonates, polyethers, cellulose plastics, and mixtures thereof.

17. The method as claimed in claim 11, wherein the low boiling point solvent is a member selected from the group consisting of methylene chloride, carbon disulfide, acetone, ethyl acetate, methyl acetate, chloroform, tetrahydrofuran, carbon tetrachloride, methyl ethyl ketone, benzene, allyl chloride, ethyl ether, petroleum ether, n-pentane, cyclopentane, n-hexane and cyclohexane.

18. The method as claimed in claim 11, wherein the amount of said polymer is in the range of from $\frac{1}{20}$ to $\frac{1}{5}$ by weight based on the high boiling point solvent.

19. The method as claimed in claim 11, wherein the amount of said polymer is more than $\frac{1}{10}$ by weight based on the high boiling point solvent.

20. The method as claimed in claim 11, further comprising the addition of a water-soluble protective colloid selected from the group consisting of gelatin, gum arabic, casein, hydroxyethyl cellulose, carboxymethyl cellulose, starch, polyvinylpyrrolidone and sodium polyacrylate.

21. The method as claimed in claim 11, further comprising the addition of a member selected from the group consisting of an anionic surfactant, a nonionic surfactant, and cationic surfactant.

References Cited
UNITED STATES PATENTS

| | | | |
|---|---|---|---|
| 3,016,308 | 1/1962 | Macaulay | 252—316 X |
| 3,173,878 | 3/1965 | Reyes | 252—316 |
| 3,415,758 | 12/1968 | Powell et al. | 252—316 |
| 3,418,250 | 12/1968 | Vassiliades | 252—316 |

FOREIGN PATENTS

| | | | |
|---|---|---|---|
| 1,048,696 | 11/1966 | Great Britain | 252—316 |

RICHARD D. LOVERING, Primary Examiner

U.S. Cl. X.R.

117—36.9, 62.2, 100 A; 252—314; 264—4